United States Patent
Chan et al.

(10) Patent No.: US 10,832,302 B2
(45) Date of Patent: Nov. 10, 2020

(54) METHOD FOR DIGITAL RECIPE LIBRARY AND FOOD IMAGE RECOGNITION SERVICES

(71) Applicant: FORQ, INC., Mountain View, CA (US)

(72) Inventors: Valerie Chan, Mountain View, CA (US); Ziv Gillat, Mountain View, CA (US)

(73) Assignee: FORQ, INC., Mountain View, CA (US)

( * ) Notice: Subject to any disclaimer, the term of this patent is extended or adjusted under 35 U.S.C. 154(b) by 295 days.

(21) Appl. No.: 15/765,447

(22) PCT Filed: Oct. 28, 2016

(86) PCT No.: PCT/US2016/059532
§ 371 (c)(1),
(2) Date: Apr. 2, 2018

(87) PCT Pub. No.: WO2017/075498
PCT Pub. Date: May 4, 2017

(65) Prior Publication Data
US 2018/0308143 A1    Oct. 25, 2018

Related U.S. Application Data

(60) Provisional application No. 62/248,482, filed on Oct. 30, 2015.

(51) Int. Cl.
G06Q 30/00 (2012.01)
G06Q 30/06 (2012.01)
G06Q 30/02 (2012.01)
(Continued)

(52) U.S. Cl.
CPC ....... *G06Q 30/0623* (2013.01); *G06F 3/0482* (2013.01); *G06F 3/04817* (2013.01);
(Continued)

(58) Field of Classification Search
CPC .......... G06Q 30/0623; G06Q 30/0205; G06Q 30/0278; G06Q 30/0282; G06Q 30/06;
(Continued)

(56) References Cited

U.S. PATENT DOCUMENTS 6,005,562 A    12/1999  Shiga et al.
2007/0077944 A1    4/2007  Bellenger et al.
(Continued)

OTHER PUBLICATIONS

Zhang, Weiyu, et al. ""snap-n-eat" food recognition and nutrition estimation on a snnartphone." Journal of diabetes science and technology 9.3 (2015): 525-533. (Year: 2015).*
(Continued)

*Primary Examiner* — Matthew E Zimmerman
(74) *Attorney, Agent, or Firm* — Ascenda Law Group, PC

(57) ABSTRACT

Disclosed herein are systems, methods, and machine readable media for implementing a service for sharing and providing information about food and recipes, and in certain embodiments, including a step of automatically identifying dishes present in photos stored on a mobile device. Automatic identification of dishes in images may be used to populate a food and recipe database, suggest restaurants serving similar food, estimate nutritional content in a user's diet, populate a shopping list, and provide other food related services.

19 Claims, 12 Drawing Sheets

(51) Int. Cl.
  *G06Q 50/12* (2012.01)
  *G06F 3/0481* (2013.01)
  *G06F 3/0482* (2013.01)
(52) U.S. Cl.
  CPC ..... *G06Q 30/0205* (2013.01); *G06Q 30/0278* (2013.01); *G06Q 30/0282* (2013.01); *G06Q 30/06* (2013.01); *G06Q 30/0643* (2013.01); *G06Q 50/12* (2013.01)
(58) Field of Classification Search
  CPC .......................... G06Q 30/0643; G06Q 50/12; G06F 3/04817; G06F 3/0482
  See application file for complete search history.

(56) References Cited

U.S. PATENT DOCUMENTS

| | | | | |
|---|---|---|---|---|
| 2009/0237546 | A1* | 9/2009 | Bloebaum | H04N 1/00323 348/333.01 |
| 2013/0120454 | A1 | 5/2013 | Shechtman et al. | |
| 2013/0171304 | A1 | 7/2013 | Huntley | |
| 2014/0249966 | A1 | 9/2014 | Zaragoza et al. | |
| 2014/0324624 | A1 | 10/2014 | Ward et al. | |
| 2014/0334691 | A1* | 11/2014 | Cho | G06Q 30/0631 382/110 |

OTHER PUBLICATIONS

International Search Report and Written Opinion dated Feb. 27, 2017, from the ISA/US, for International Patent Application No. PCT/US2016/059532 (filed Oct. 28, 2016), 15 pages.

International Preliminary Examination Report dated May 11, 2018, from the International Bureau, for International Application No. PCT/US2016/059532 (filed Oct. 28, 2016), 9 pages.

Supplementary European Search Report dated Aug. 23, 2018, from the European Patent Office, for EP Application No. 16860975.8, 11 pages.

* cited by examiner

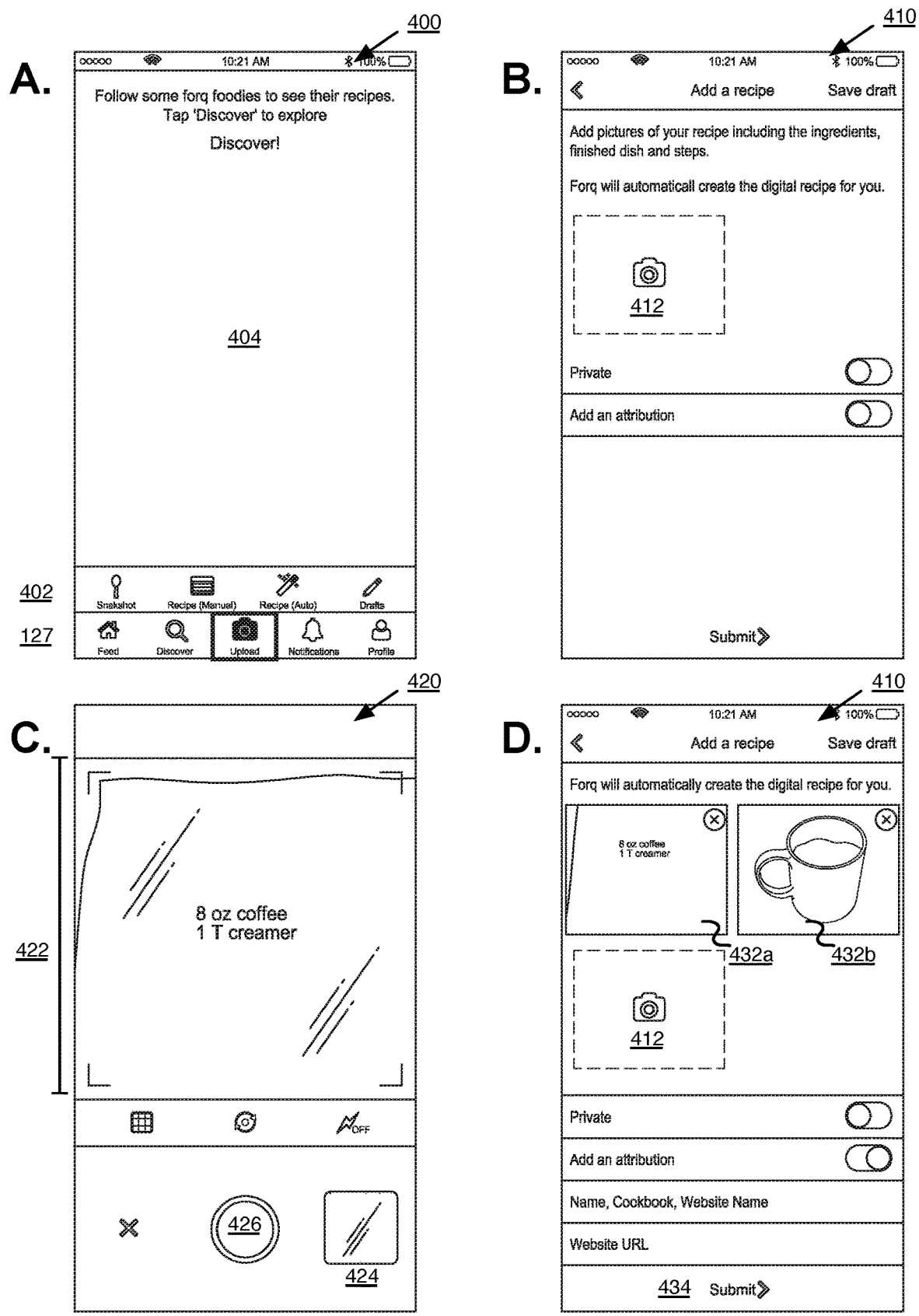
FIG. 4A-D

E.
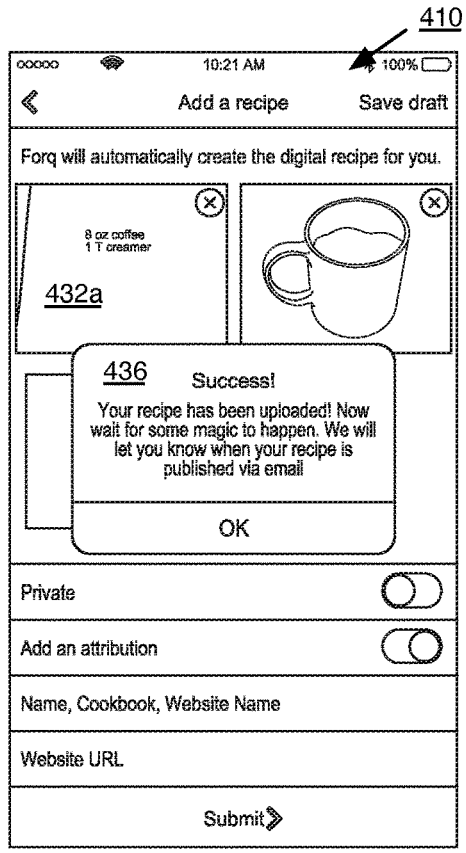
F.
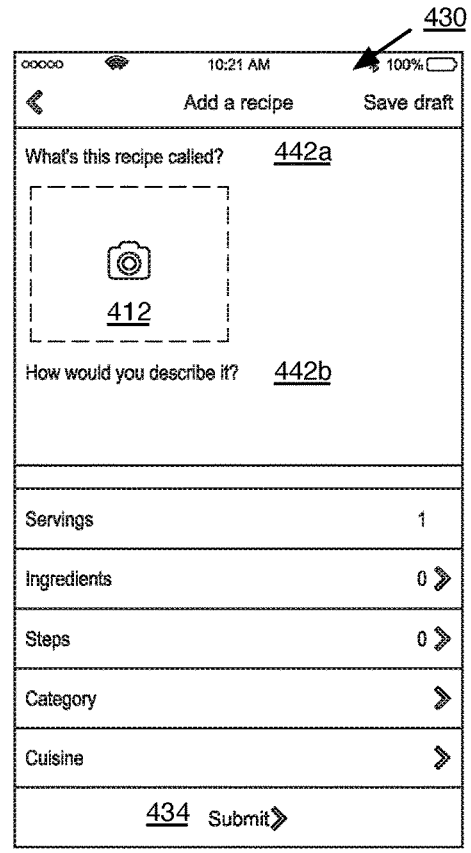
FIG. 4E-F

METHOD FOR DIGITAL RECIPE LIBRARY AND FOOD IMAGE RECOGNITION SERVICES

RELATED APPLICATIONS

This application claims the benefit of U.S. Provisional Patent Application No. 62/248,482, filed on Oct. 30, 2015, the disclosure of which is incorporated herein by reference in its entirety.

FIELD OF THE INVENTION

The present invention relates to apparatuses, systems, computer readable media, and methods for the provision of services concerning sharing and analyzing information about food and recipes, including recognition of food in images.

BACKGROUND

The preparation and consumption of meals is a part of all people's lives. Different recipes and prepared dishes may be an expression of culture and personal preferences. Some individuals may also have specific dietary needs that lead to a particular interest in a recipe or food niche. Because of the existence of so many types of food and ways of preparing it, there is a need for both new approaches for discovering and cataloging recipes and meals tailored to an individual's particular needs and interests. Additionally, there is a need for leveraging preferences and interests in food that can facilitate desirable experiences (such as identifying a new restaurant that serves a favorite food), efficiently cataloging nutritional content of a recipe or a collection of recipes, and other benefits such as automatically populating a shopping list for meal planning. Disclosed herein are embodiments of an invention that address those needs. In particular, embodiments described in this disclosure may allow users to share recipes and information about dishes (e.g., prepared foods), may involve a step of automatically identifying dishes present in photos stored on a mobile device, and may facilitate further analysis of this information in providing food-related services to the users.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which:

FIGS. 1-6 show exemplary user interfaces concerning a system for providing food and recipe-sharing services, in accordance with some embodiments of the invention;

DETAILED DESCRIPTION

Disclosed herein are systems, methods, and machine readable media for implementing a service for sharing and providing information about food and recipes, including a step of automatically identifying dishes present in photos or images stored on a mobile device. Automatic identification of dishes in images may be used to populate a food and recipe database, suggest restaurants serving similar food, estimate nutritional content in a user's diet, populate a shopping list, and provide other food-related services.

As used herein, a "dish" refers to a prepared food item including one or more ingredient. A "dish object" refers to an object having an image of the dish (typically, a photo) and associated attributes concerning the dish, including a reference to the user who created the photo, and additional optional attributes including tags that characterize the dish, a title of the dish, and classification information that may be assigned manually or as a result of image analysis. A "recipe" refers to a dish object having as an attribute an ingredient list for a dish (containing one or more ingredients) and may further include as an attribute instructions or steps performed concerning the ingredient list to prepare the dish. Dish objects and recipes may be represented in user interfaces by displaying all or some of their attributes (e.g., a photo and title for a dish object).

In certain embodiments, a recipe may be created within the system when a user takes a photo of a written recipe as well as of the completed dish, e.g., using a mobile device having a camera function, and submits the photos to the system. A user may submit a photo of a dish (e.g., a SNACKSHOT™) to be used as part of the service, by creating a dish object from the photo. Dish objects may be tagged, analyzed, cataloged, and shared with other users, for example as described below.

The service provides various user interfaces (UI). One exemplary UI provides a feed of updates to a user. A user's feed may show recent updates from other users that a user follows (e.g., the feed may display recent dish objects and recipes that have been recently shared); if a user is not following any other users, the feed may be empty. UIs for a feed and other UIs may include navigational controls, including controls for selecting a feed (e.g., this user's feed) a search UI, a photo upload UI, a notifications UI, and a profile UI.

Figure 1:
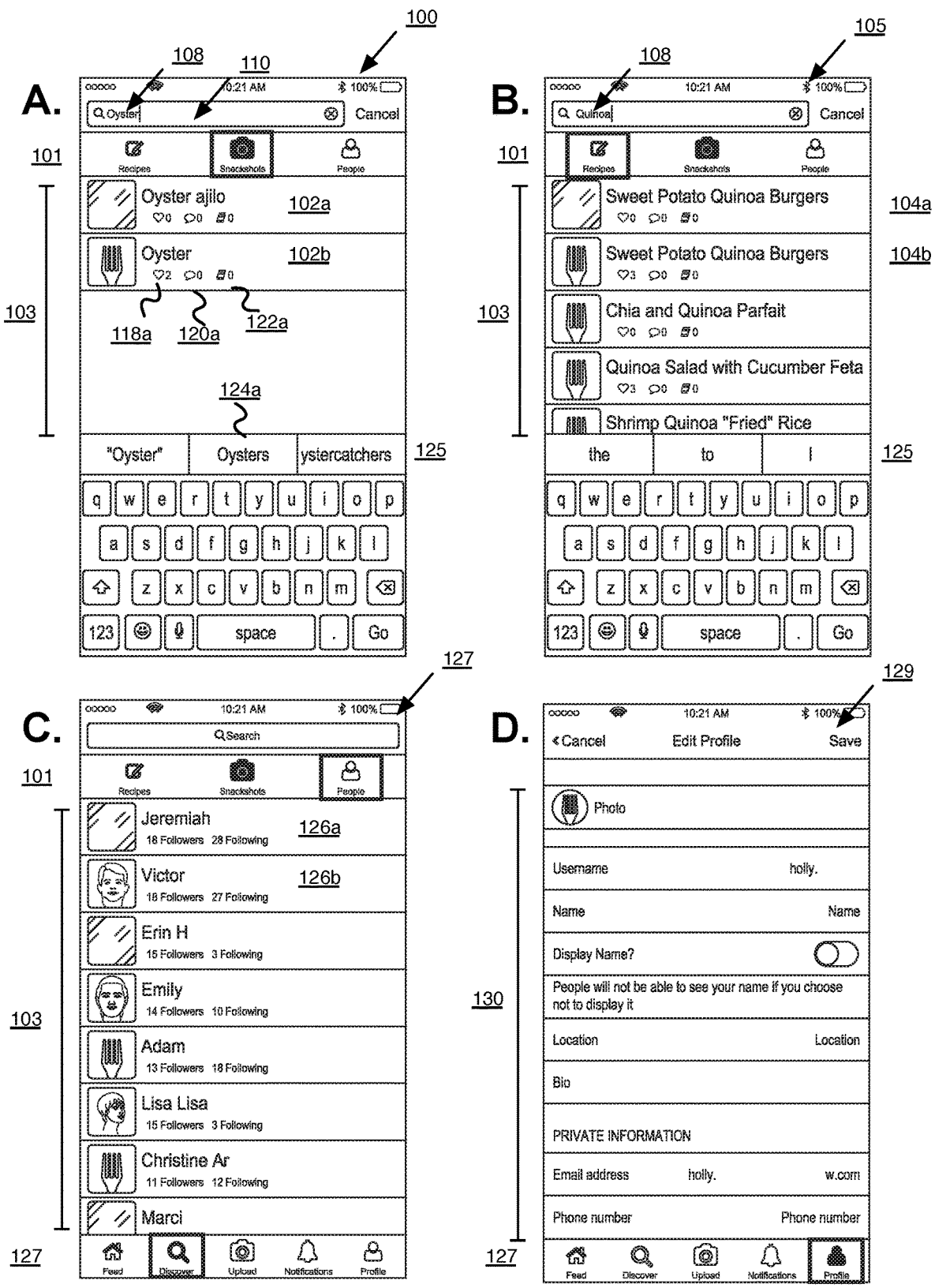

FIG. 1 provides four exemplary UIs from a system for providing food and recipe-sharing services. FIGS. 1A (showing UI 100) and 1B (showing UI 105) provide search result pages for dish objects and recipes, respectively. In FIG. 1A, the dish object (e.g., "SNACKSHOTs™") category is selected in category control panel 101, and particular dish objects 102 are enumerated in the result list panel 103. In FIG. 1B, "recipes" category is selected, and particular recipes 104 are enumerated in result list panel 103. Responsive items provided via result list panel 103 (e.g., dish objects 102 or recipes 104) are relevant to a particular search query 108 (e.g., because the search query appears in a title or description of the item, or a related term to query 108 is otherwise associated with the responsive item, such as a type of cuisine that characterizes the item). Recipes in search results may include a title for the dish object 102 or recipe 104, total "likes" or "hearts" or some indication of the number of users who have appreciated the recipe (likes 118), an indication of the number of comments (comments 120), and an indication of the recipe's membership in collections of recipes (collections 122). Collections 122 may be named categories of items, such as types of recipes or dish objects. Possible examples of collections of recipes or dish objects include "Mediterranean," "low fat," and "weeknight favorites." In certain embodiments, a searching UI may also provide controls and functionality for searching recipes, dish objects, and users, including search bar 110 for receiving search queries 108, and selectable suggested query terms 124 (e.g., predictions of useful search terms based on a partially entered query term 108) via suggestion panel 125. In certain embodiments, user interfaces 100 or 105 may provide a candidate list of recent searches (e.g., previous search queries 108) that may be selected by the user to generate the associated list of search results. When the user is not editing a search query 108, user interfaces 100 and 105 may provide a navigation panel 127 as shown in FIG. 1C, providing selectable elements that permit the user to navigate to, for example, the user's own feed (i.e., the user viewing UIs 100 and 105), search various items, create a new recipe or dish object ("upload"), view notifications, or view and edit the user's profile.

FIG. 1C shows user interface 128, providing a search result page for searching users 126 (e.g., "people"). In certain embodiments, each user result enumerated in result list panel 103 of user interface 128 shows a profile image, a user name, a number of followers for the user 126, and a number of users following that user. In certain embodiments, if a particular user 126a follows another user 126b, user 126a will be presented with updates from other user 126b via a UI providing a feed of updates from all the users 126 that user 126a has followed.

FIG. 1D shows a user interface 140 for editing the present user's own user profile 130, including providing a user photo, a location, a biographical description, and permitting editing of additional information such as contact information. In certain embodiments, a user profile 130 may contain additional information about the user 126 based on inferred preferences, for example based on categories of food (e.g., Mediterranean, vegetarian, low-fat, savory, dishes containing a class of ingredients such as nuts, starches, or chocolate) that characterizes recipes 104 and dish objects 102 that the user frequently "likes" 118, or based on the time the user spends viewing such items (where more time viewing items associated with a stronger preference for the associated category of food). Such preferences may be inferred using machine learning techniques. In certain embodiments, information for user profile 130 may be provided by the user 126 in response to a series of questions or preferences wizard. In certain embodiments, only some of the information in user profile 130 is editable or viewable via user interface 140. In certain embodiments, UI 140 may be accessed via an "edit profile" control provided via any other UI provided by the service—e.g., as shown in UI 600 discussed below.

Figure 2:
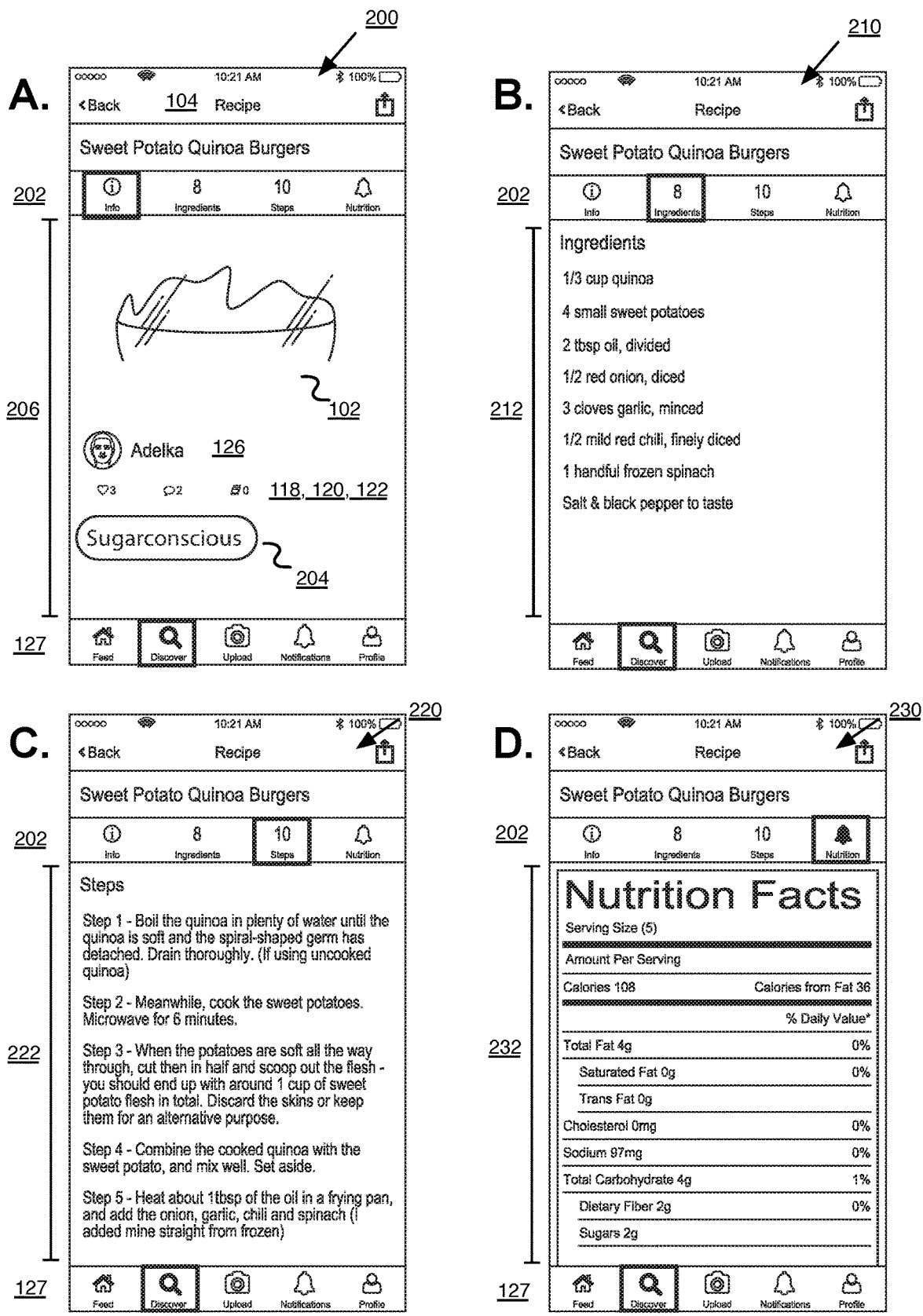

FIG. 2 provides four exemplary UIs concerning recipes from a system for providing food and recipe-sharing services. FIG. 2A shows an exemplary recipe information UI 200, showing an exemplary recipe 104 entitled "Sweet Potato Quinoa Burgers." UI 200 provides a recipe control panel 202 providing selectable elements that permit a user to navigate between, e.g., recipe info, an ingredients list, steps for preparing the dish, and nutritional information for the dish. UI 200 further provides a recipe information panel 206 that displays a dish object 102 corresponding to the resulting dish, indicates that this particular recipe 104 has three "likes" 118, two comments 120, and membership in zero collections 122. Panel 206 additionally indicates the user 126 who created or posted this recipe 104, and may present any tags 204 that characterize the recipe, such as "sugar-conscious" or "quinoa," and may list user comments 120 (not visible in FIG. 2A). In certain embodiments, tags 204 may be used to identify relevant search results that may be presented in search UIs such as 100 or 105. In certain embodiments, recipe control panel 202 or recipe information panel 206 contains a selectable element for accessing a printable recipe listing ingredients and steps together, or an alternative recipe view for displaying the ingredients and steps together on a device such as a tablet for reference while cooking the corresponding dish.

FIG. 2B shows UI 210, which presents an exemplary ingredient list for the "Sweet Potato Quinoa Burgers" recipe in ingredient list panel 212. FIG. 2C shows UI 220, which presents an exemplary list of steps for preparing the "Sweet Potato Quinoa Burgers" recipe 104 in step list panel 222.

FIG. 2D shows UI 230, which presents exemplary nutritional information in nutritional information panel 232, providing specifics about the nutritional content of the recipe, including, for example, the serving size, the calories per serving, the fat, cholesterol, sodium, and carbohydrate content for the recipe. In certain embodiments, such nutritional information may be automatically provided for a recipe based on its ingredient list. For example, the service may provide constituent ingredients and amounts of same from the ingredient list for a recipe to a remote database or service (e.g., the U.S. Department of Agriculture Food Composition Database), receive corresponding nutritional information for the ingredients and aggregate that information into, for example, the information shown in nutritional information panel 232.

Figure 3:
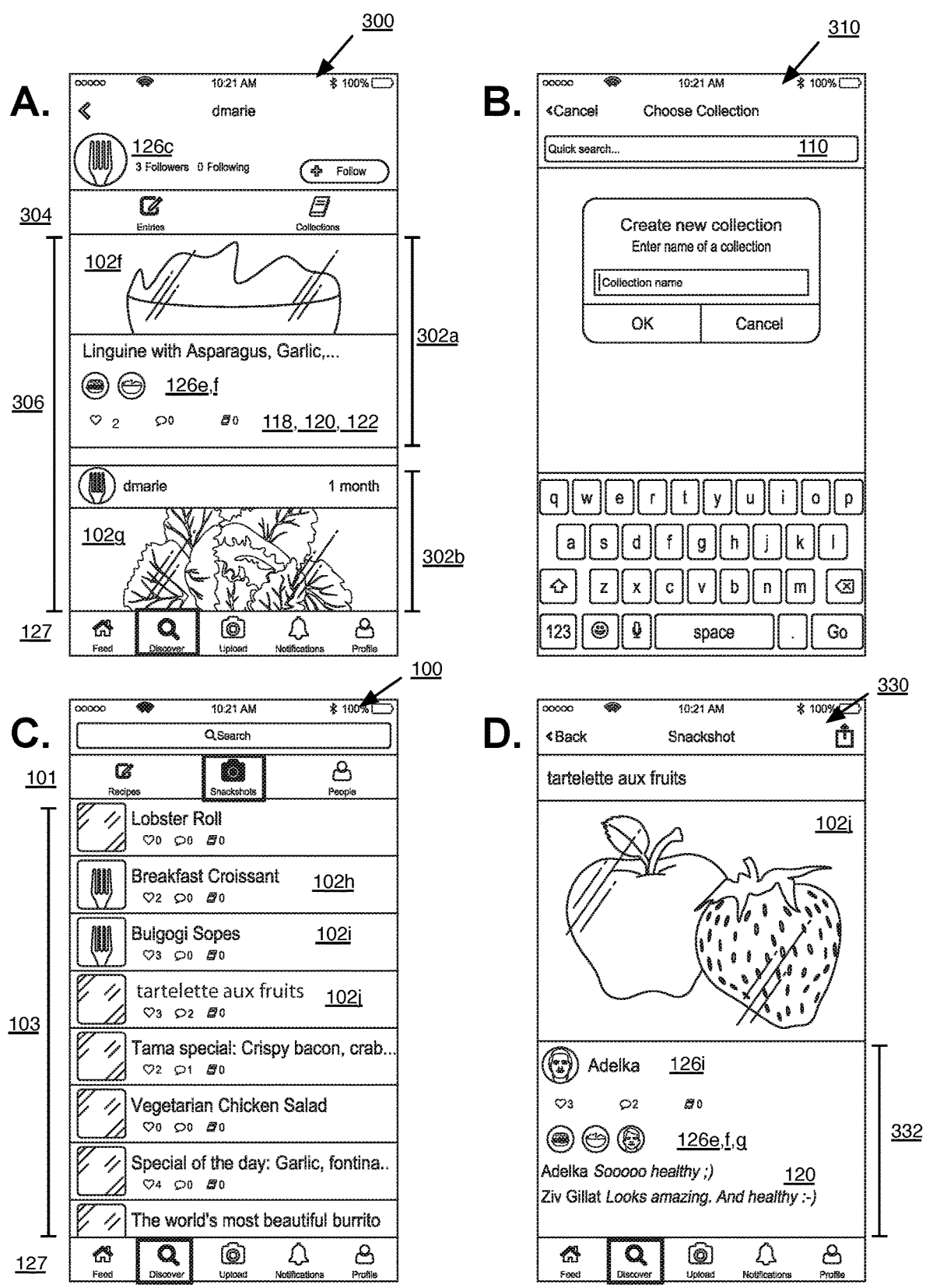

FIG. 3 provides four exemplary UIs from a system for providing food and recipe-sharing services. FIG. 3A shows UI 300, which presents a feed of entries 302 from the same user "dmarie" (126c), and provides an option to follow the user and interact with the user's entries providing access to corresponding recipes 104 and dish objects 102. UI 300 includes a feed control panel 304 for accessing entries and collections of entries respectively associated with user 126c. Feed panel 306 contains a listing of portions of two entries, 302a and 302b. Each entry may correspond to a recipe 104 or a dish object 102, as shown, include a dish object (102f and 102b), a title for the dish, an indication of the user who created the entry (user 126c), an indication of the users who liked or commented on the entry (users 126e and 126f for entry 302a), and a posting date or last edit date (or elapsed time since same). The feed of entries shown in FIG. 3A may be all entries posted by user 126c, or the entries associated with a particular collection defined by use 126c, either of which may be accessed via feed control panel 304. In certain embodiments, the service may provide a feed of entries from all users followed by a particular user 126, in which the entries are ordered from most recent to oldest based on the time each entry was posted or edited. In certain embodiments, such a feed may include entries from all users of the system, or a subset of users of the system (such as, for example, users or entries associated with a particular geographic location within a certain distance from a user, or entries falling within a particular collection, associated with a tag, or relevant to a search query term), or a subset of users followed by another user. A user's own feed may be set using preferences, and may include, for example, the users's own posted entries, entries posted by users followed by the current user, or a combination of these entries.

FIG. 3B shows an exemplary UI 310 for creating a new collection of recipes 104 and/or dish objects 102—e.g., the user may provide a name (e.g., category) for the collection, and may associate recipes and dish objects with that collection. In certain embodiments, collections are implemented as tags 204 associated with recipes and/or dish objects. FIG. 3C shows another view of exemplary UI 100 for searching and listing dish objects 102 (e.g., SNACKSHOTs™). In UI 100, each dish object 102 is associated with a tally of user "likes", comments, and collections. FIG. 3D shows UI 330, which presents an exemplary UI for viewing and interacting with a single entry 302 containing a dish object 102j posted by user 126j, including providing comments 120 left by users 126e-g upon interacting with a comment control or dialog box. In certain embodiments, a user may access UI 330 by selecting a particular dish object 102j enumerated as shown in FIG. 3C in list panel 103 of UI 100. Information about the dish object may be provided in dish object information panel 332, including, for example, tags 204 that characterize the dish object.

FIG. 4 provides six exemplary UIs from a system for providing food and recipe-sharing services, here concerning approaches for creating new recipes 104 in the system. FIG. 4A shows an exemplary UI 400 by which upon a user's selection of an upload photo control (or "create new recipe/dish object" option) in navigation panel 127, the user is provided with a create-item panel 402 allowing the user to select a dish object option, a manual recipe option, an automatic recipe option, and drafts. In certain embodiments, selecting any of the options in create-item panel 402 will allow a user to take a photo using a mobile device or select a photo from the photos saved on the mobile device, and upload one or more photos and associate it with a new dish object 102 or new recipe 104. In certain embodiments, panel 402 may be accessed from any UI that includes navigation panel 127, such that panel 404 can display any of a variety of other UI elements, including, for example, the elements of UI 100. FIG. 4B shows an exemplary UI 410 that may be provided as a result of selection of the automatic recipe option in UI 400. The exemplary UI 410 includes a photo upload control 412 which when selected will access a mobile device camera and/or the saved photos on the local device. It also includes an option to make the recipe private, and to enter an attribution for the recipe, such as a person's name, a cookbook, or a website. FIG. 4C shows an exemplary camera UI 420 in which the data perceived by the mobile device's camera is displayed in camera panel 422, showing an image of steps for a candidate recipe. UI 420 additionally shows a saved-image-selection-control 424 and a save-current-camera-display-control 426 to record a new photo 432. FIG. 4D shows another view of UI 410 after two photos 432 have been associated with the draft automatic recipe, e.g. using UI 420. The UI further provides a submit control 434 for submitting the photos to be analyzed to automatically create a recipe 104. In certain embodiments, the system will automatically determine if an image includes text that corresponds to an ingredient list and/or steps for composing a recipe, and will automatically recognize when a photo represents a photo of the completed dish (e.g., appropriate for an attribute of a dish object 102) corresponding to the recipe using machine learning techniques. The system may create a new recipe 104 associated with the completed dish object, the ingredient list, and steps for composing the recipe. FIG. 4E shows an alert message 436 overlaying UI 410 upon a user's selection of submit control 434, providing information about an automatic recipe submission. FIG. 4F shows a user interface 430 for manually creating a recipe 104, including photo upload control 412 for uploading a completed dish object, prompts 442 including a field 442b by which a free-text description may be entered, and additional categories of information such as number of servings and ingredients that can be selected from lists or entered via free text fields. UI 430 provides a submit control 434 for creating the recipe based on the entered information. A UI similar to UIs 410 or 430 may be used to create a new dish object 102 (e.g., in which no information is requested or required regarding an ingredient list, and requesting or suggesting other appropriate attributes, such as a restaurant name).

Figure 5:
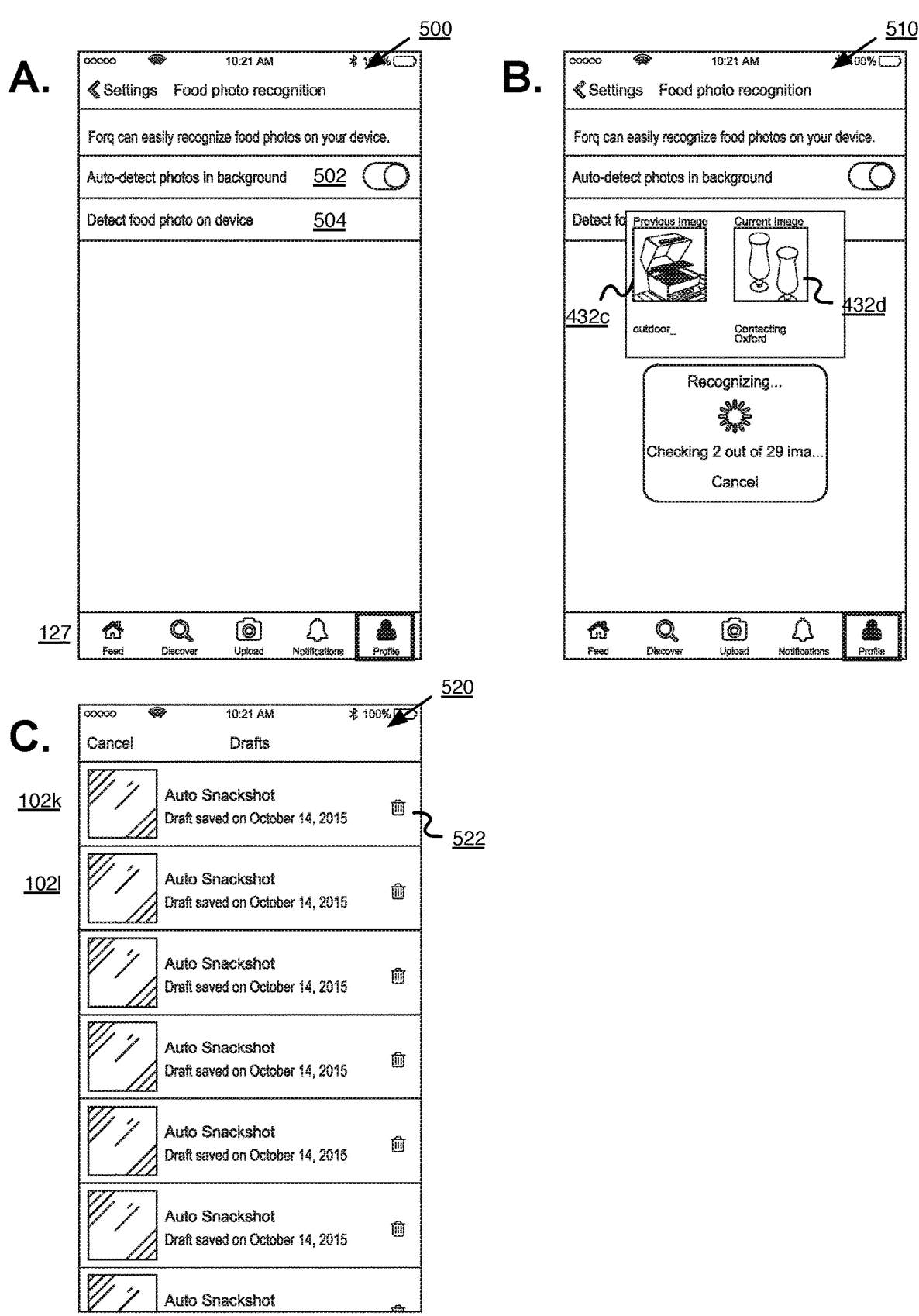

FIG. 5 provides three exemplary UIs from a system for providing food and recipe-sharing services, and food image recognition services in particular. FIG. 5A shows an exemplary UI 500 from a collection of settings menus, showing settings including a toggle 502 for automatically detecting photos taken using the device that are appropriate for new dish objects 102, and a setting for identifying such photos already stored on the device. In certain embodiments, each photo 432 taken using the user's mobile device is used to create a smaller image (e.g., a thumbnail), and that image is provided to a server for analysis. The analysis involves categorizing whether the smaller image contains food, and what kind of food is present, using a machine learning algorithm such as a neural network. FIG. 5B shows an exemplary user interface 510 displaying an image analysis progress indicator, in which photos 432 local to the device are analyzed to determine if they contain food (e.g., by creating and providing a smaller image to a server for the determination). In certain embodiments, photos 432 that are determined to contain food may be used to create a new dish object 102, while photos 432 that are determined not to contain food are not processed further. In certain embodiments, the image analysis may predict the type of food, and the type of food may be used to, for example, automatically set a title for the new dish object 102, define tags 204 associated with the dish object 102, or associate internal metadata with the dish object 102 or service in general (e.g., the food type may be used to modify a user's preferences as represented in the user's profile 130). In certain embodiments, the user may be prompted to confirm that the photo 432 should be used to create a new dish object, and/or to add a name or description to the photo. In certain embodiments, selecting any of the enumerated draft items (e.g., 102k or 102l) may cause the user to be presented with an editing interface, e.g., an interface similar to UI 400 for editing recipes 104 or a related editing interface for editing dish objects 102. In certain embodiments, such automatically identified new dish objects may be added to a list of draft dish objects, e.g., as accessible via UI 520.

FIG. 5C shows an exemplary UI 520 providing a drafts menu listing draft dish objects 102 (e.g., that have not yet been posted as entries 302). In certain embodiments, a drafts menu may include draft recipes 104 additionally or instead of unconfirmed dish objects 102. UI 520 provides a trash control 522 for each draft item, so that if the user does not wish to post a particular dish object or recipe, or the food determination was incorrect, the draft item may be deleted using the trash control 522.

Figure 6:
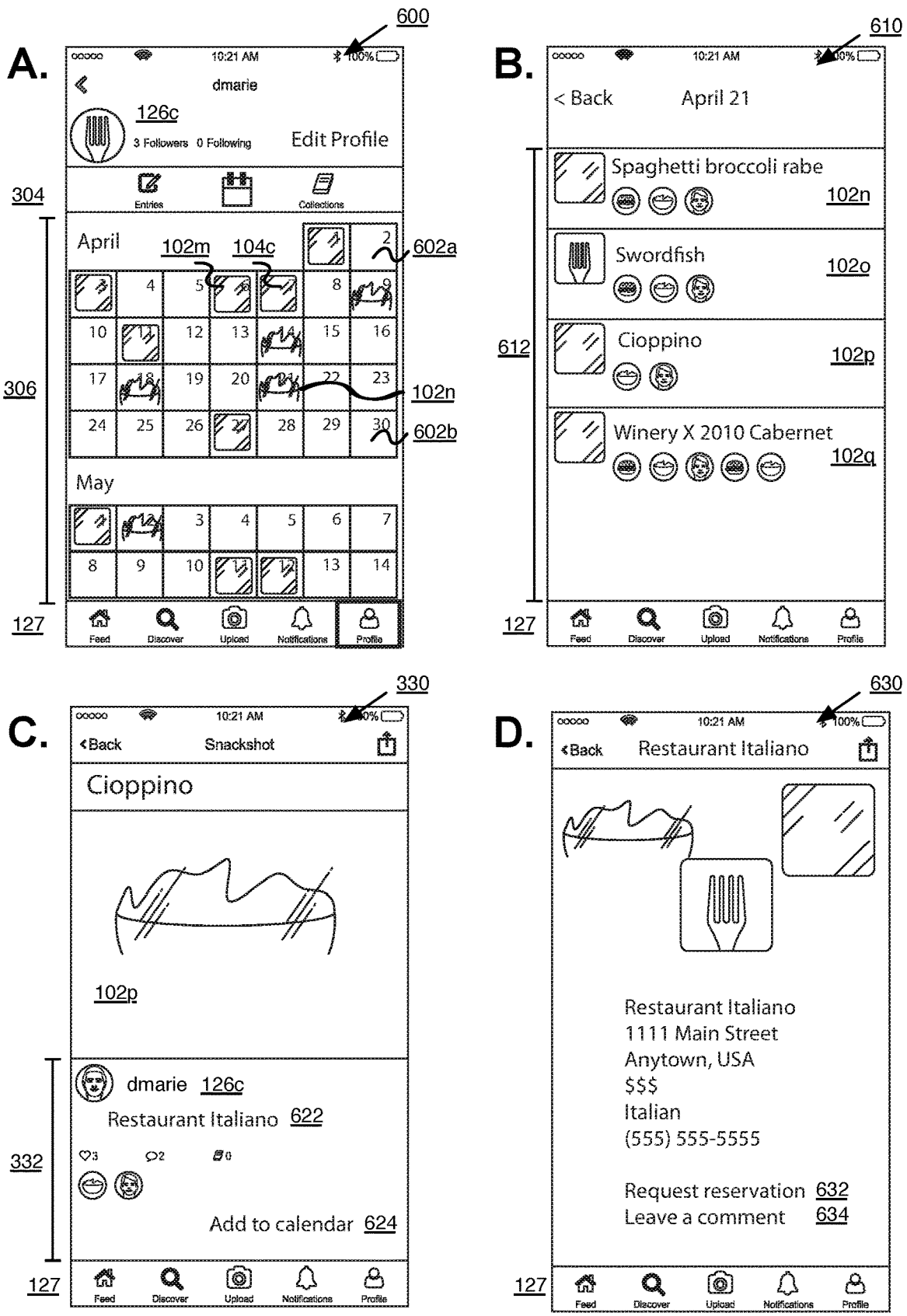

FIG. 6 provides four exemplary UIs from a system for providing food and recipe-sharing services, and associating dish objects and recipes with restaurants, in particular. FIG. 6A shows exemplary UI 600, which provides a calendar view of a user's posting activity with the food and recipe-sharing service. UI 600 includes a feed control panel 304 which, in the embodiment disclosed here, permits a user to select a calendar view in addition to a feed of entries and a feed of one or more collections of entries. In this embodiment, feed panel 306 displays the calendar view of the user's posting activity, in which representations of days 602 organized into months are shown, such that one or more months (or portions of months) are visible. Each day representation 602 may be a selectable element, with the appearance modified to indicate if a particular day is associated with one or more dish objects 102 or recipes 104 (e.g., as shown in FIG. 6A, a thumbnail image of the photo attribute of a dish object, e.g., 102*m-n*, or photo associated with a recipe, 104*c*, is shown in feed panel 306 at the location of the respective day representation 602). In certain embodiments, selection of any day representation 602, e.g. the day representation co-localized in the UI with a thumbnail of dish object 102*n*, will cause the user to be presented with a day listing UI, such as UI 610, shown in FIG. 6B. UI 610 indicates the day it is associated with ("April 21"), and provides a day listing panel 612 that enumerates the dish objects 102 and/or recipes 104 that were associated with that day (e.g., each was part of an entry 302 that was posted or created on that day, or manually associated with that day). Each enumerated item (e.g., dish objects 102*n-q*) may indicate the users who have liked the item, a tally of likes, comments, and collections associated with the item, and the like. In certain embodiments, a day listing UI may provide a control for associating a new item (e.g., dish object or recipe) with that day, e.g. by associating an existing item or creating a new one. Each enumerated item in day listing panel 612 may provide a selectable element.

FIG. 6C shows another view of exemplary UI 330 for viewing and interacting with a dish object 102, that may be presented to the user as a result of selecting dish object 102*p* via UI 610 in FIG. 6B. In the embodiment shown in FIG. 6C, UI 330 shows an exemplary representation of a dish object 102—specifically, it provides a restaurant indication 622 that is associated with the item (here, dish object 102*p*). For example, user 126*c* may have been served the underlying dish at the restaurant (here, "Restaurant Italiano"), and UI 330 shows a photo associated with dish object 102*p*, which is a photo of the underlying dish. Similarly, in certain embodiments, a recipe may be associated with a restaurant, such that, for example, recipe UI 200 may present a corresponding restaurant indication 622. In certain embodiments, UI 330 may provide an add-to-calendar control 624 for associating any dish object with a user's calendar (e.g., to cause the dish object to be accessible via UIs 600 and 610). In certain embodiments, restaurant indication 622 is a selectable element, or one or more related selectable elements or controls is provided in the UI, permitting a user to access more information about the restaurant or interact with the restaurant. In certain embodiments, restaurant indication 622 provides a listing of multiple restaurants.

FIG. 6D shows an exemplary UI 630 concerning a restaurant. Upon selecting restaurant indication 622 or a related element in UI 330 as shown in FIG. 6C, the user may be presented with UI 630, which provides information about a particular restaurant (here, "Restaurant Italiano"). UI 630 may present dish objects 102 associated with the restaurant that were created by the current user and/or other users. UI 630 may provide information about the restaurant such as the location/address (for example, showing a location on a map or providing a link to a mapping service that will present the location of the restaurant on a map), contact information, one or more categories of food served by the restaurant, and the like. In certain embodiments, UI 630 may permit a user to request a reservation at the restaurant (via reservation control 632), or leave a comment about the restaurant (via comment control 634).

Figure 7:
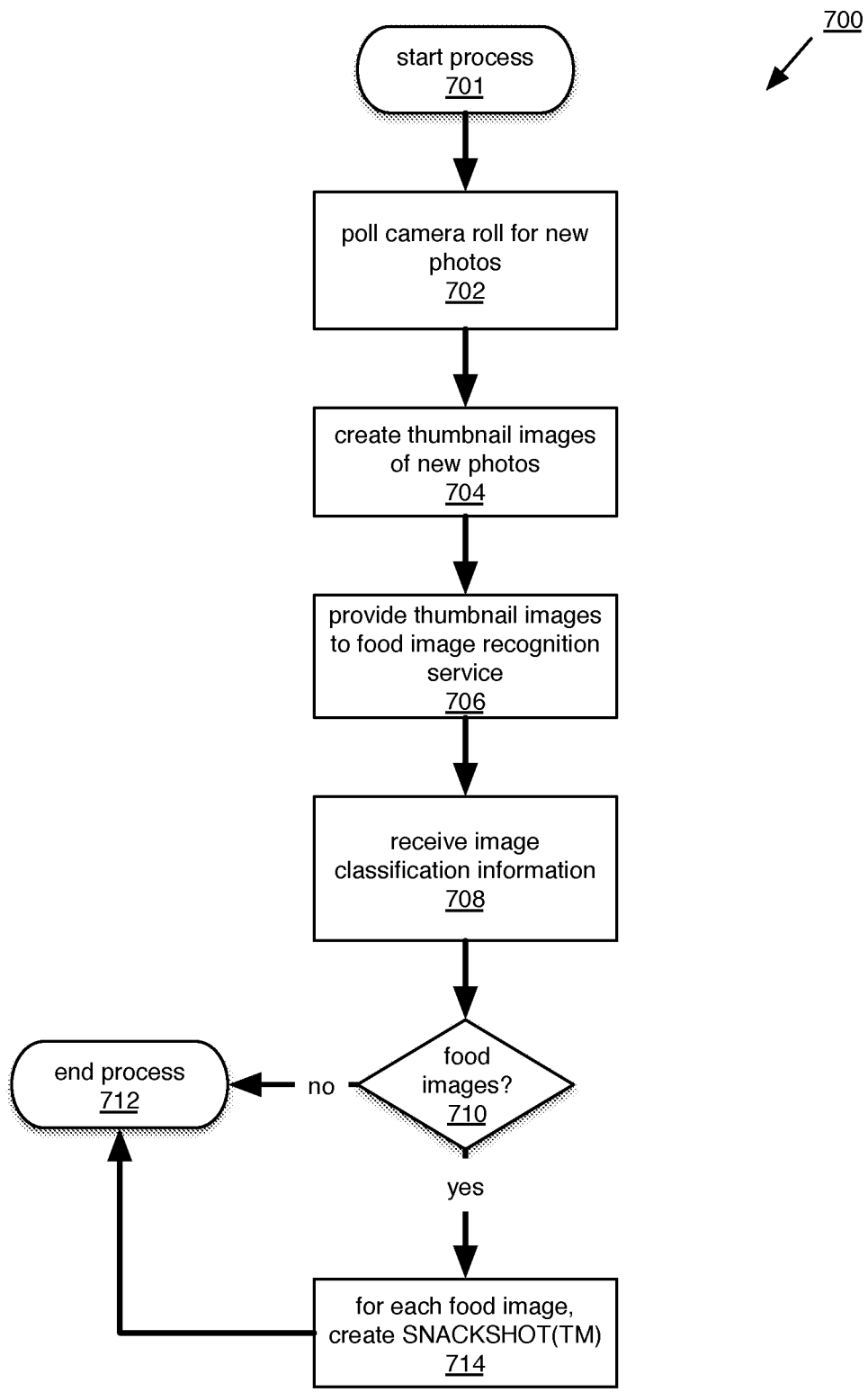
FIG. 7 is a flow chart depicting an exemplary method for providing services in connection with automatically identifying food in images stored on a computing device, in accordance with some embodiments of the invention.

FIG. 7 is a flow chart depicting an exemplary process 700 for providing services in connection with automatically identifying food in images stored on a computing device. The process may begin (701) on a regularly scheduled basis, such as once an hour, once a day, or once each specified interval. In certain embodiments, the process begins in response to an event, such as when a particular application is opened or closed, such as a mobile client for food and recipe sharing services, or the mobile device's native camera application is opened or closed. In step 702, the mobile device's native image store is polled for new photos or other types of images. In certain embodiments, this may be referred to as polling the device's camera roll. In step 704, smaller images are created using the new images. In certain embodiments, step 704 occurs on the mobile device. In certain embodiments, step 704 occurs on a remote server. In certain embodiments, step 704 is skipped, and step 706 proceeds using the original full-size images. In certain embodiments, the smaller images are 50%, 30%, 20%, or 10% the size of the original images. In step 706, images are received at an image recognition service. (E.g., images are provided to the image recognition service.) In certain embodiments, the images are received at the image recognition service from a server. In certain embodiments, the images are received at the image recognition service from a mobile device. Steps 706-714 may be executed by a mobile device and/or a server. In certain embodiments, the image recognition service determines if the image contains a food-related item. If the image contains a food-related item, the service determines what type of food related item is contained in the image. In certain embodiments, the food recognition service may determine a hierarchical classification or assemble a collection of tags for the identified food item, including, for example, name of the food, ingredients in the food if it is a dish, type of cuisine for the food, dominant color of the food, key ingredient, and the like. Such classification information is received from the food image recognition service (708). In step 710, if the new photos are determined not to contain food, the process completes (712). If the new photos are determined to contain food, each photo that contains food is used to create a new dish object using the classification information or the collection of tags (collectively, food identification information) (714)—e.g., the name of the food in the food identification information may be used to set the name attribute of the dish object. After the new dish objects have been created, the process is completed, and additional processes may be used to leverage the food identification information in the context of the food and recipe sharing system (712). In certain embodiments, step 714 may request confirmation from the user regarding whether the user wishes to create new dish objects based on the photos that have been determined to contain food. In certain embodiments, new dish objects may be automatically created, but may remain in a list of draft dish objects until confirmed by the user. In certain embodiments, the draft dish objects are private to the user.

In certain embodiments, the dish images and associated food identification information maybe be used in a calendaring system. For example, a UI may display a calendar, and indicate days on the calendar associated with a food image for one or more users. For example, a dish object may automatically be associated with the date on which it is created, the date on which the associated image was created, and/or the date on which the dish object was edited. In such a system, dish objects may automatically be associated with the calendar upon creation (e.g., through an automatic creation process such as process 700, and presented via a UI such as UI 600), and by clicking on a marked day on the calendar, a user may be taken to a UI showing one or more dish objects, such as UI 610 or UI 330. In certain embodiments, the calendar may also link to recipe UIs, such as UIs 200, 210, 220, or 230 shown in FIG. 2.

In certain embodiments, dish objects may automatically be associated with a health dashboard. A health dashboard may display nutritional, dietary, and health information for a dish or a group of dishes, and may additional include health benefits associated with a dish or its ingredients, and/or recommendations concerning the dish. The information provided by the health dashboard may be automatically associated with the dish object using the food identification information—e.g., based on known calorie counts and nutritional information associated with an ingredient in a particular portion size. In certain embodiments, aspects of a health dashboard may be provided using UI 230 shown in FIG. 2D.

In certain embodiments, dishes may be associated with restaurants based on user annotations of the dish object (where those annotations may become attributes), e.g. as shown in FIG. 6C. In certain embodiments, dishes may be associated with a restaurant based on the geographical information associated with the image in a dish object or a recipe (e.g., using the metadata associated with the underlying image—for example, the Exchangeable Image File format (EXIF) header information, or any header that provides a latitude and longitude associated with the image). In certain embodiments, dishes may be associated with a restaurant based on the current geographical location of the user (e.g., obtained from a mobile device current location, using GPS or triangulation based on a database of devices providing wireless services) who has created the dish object or recipe. In certain embodiments, the food and recipe-sharing service may provide restaurant recommendations based on a user's dish objects or recipes. For example, the service may notify the user if a restaurant serves a dish that is similar to a dish object (e.g., after the user has "liked" one or more similar dish objects). In certain embodiments, recommendations may be based on a user's search—for example, a user may search for a dish or an ingredient in a UI such as the UI shown in FIG. 1A. In response to the search, for example, search results may emphasize a restaurant alongside the dish object thumbnail. In certain embodiments, searches may be responsive to the user's current geographical location, and may prioritize search results associated with restaurants that are geographically close to the user's location (for example, within 5 miles, within 10 miles, within 20 miles, or within 50 miles of the user's location). In certain embodiments, the search results that are associated with a restaurant may provide a link to a reservation service (e.g., OpenTable™) that the user may use to request a reservation at the restaurant, or a link to a delivery service (e.g. DoorDash™, GrubHub™, or Seamless™) to request delivery of the dish.

In certain embodiments, the service may provide user-authored reviews of dish objects and/or recipes. For example, the service may provide an expanded commenting system in addition to or instead of the comments as shown in FIG. 3D that specifically displays user evaluations of the recipes. Such a reviewing system may include one or more fields for a reviewer-user to fill out, including any of whether the user made a dish using a recipe and on what date, as well as the user's comments regarding the quality of the recipe's instructions and result. In certain embodiments, a user who has created a recipe or a dish object may additionally provide a video to be associated with the recipe that gives instructions or a walk-through for constructing the subject dish; such a video may be accessed from dish object information panel 332 or recipe information panel 206.

Figure 8:
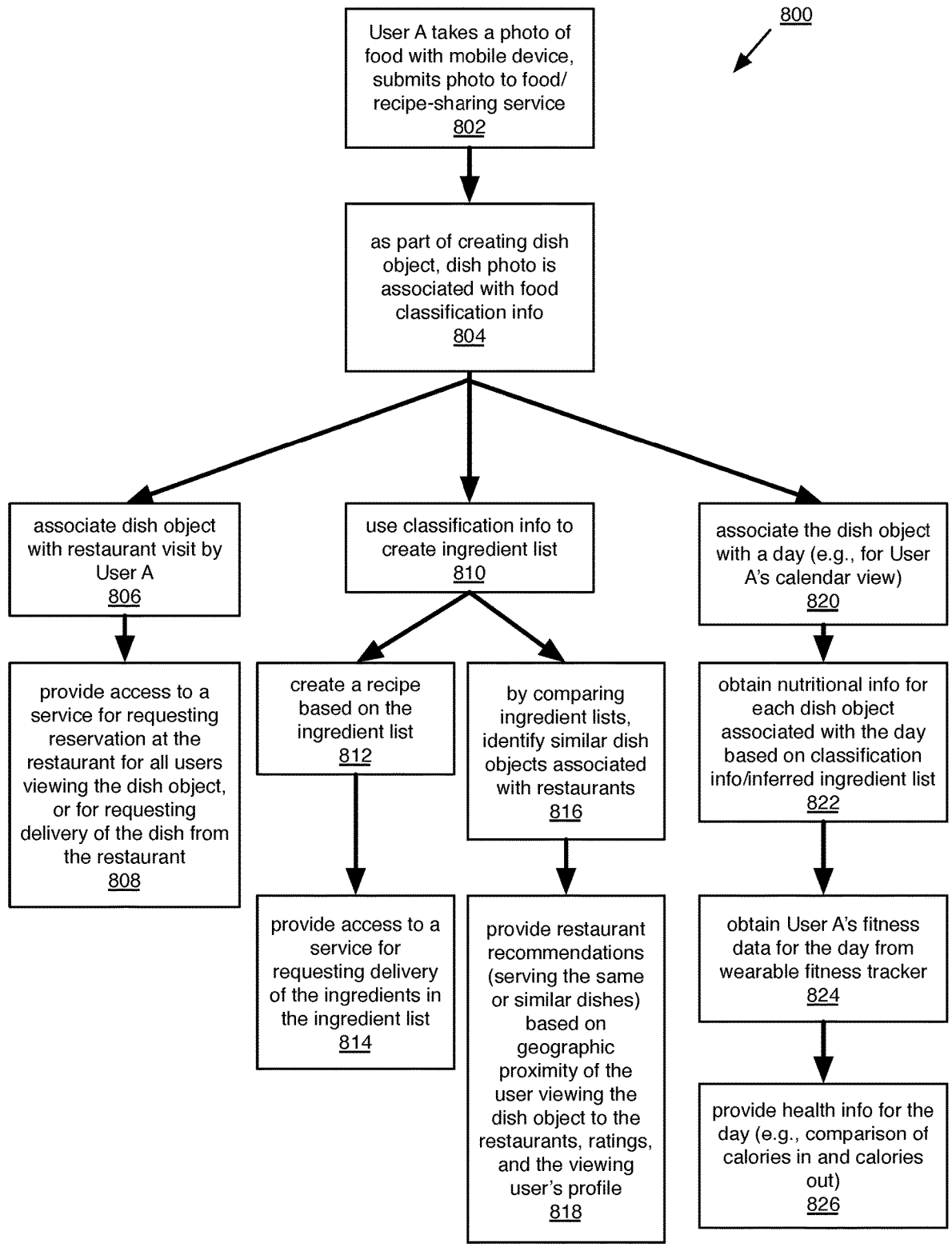
FIG. 8 is a flow chart depicting exemplary processes for providing food and recipe-sharing services, in accordance with some embodiments of the invention.

FIG. 8 is a flow chart depicting an exemplary collection of processes 800 for providing services in connection with the food and recipe-sharing service described herein. In a first step, a user initiates creation of a dish object 102 by taking a photo of food using a mobile device, and uploads or otherwise submits that photo to the service, e.g., using user interfaces similar to the recipe-creation UIs of FIG. 4 (step 802). The photo and/or a copy of the photo may be associated with a new dish object as an attribute. The submitted photo is analyzed by the service using image analysis and machine learning techniques to associate the new dish object with semantic classification information (step 804), for example, using aspects of process 700 shown in FIG. 7. The classification information may be used to create one or more attributes for the new dish object. In certain embodiments, a server receives the photo and generates the classification information, which may include the type of cuisine that characterizes the dish object (e.g., Chinese, vegetarian, spicy), as well as one or more of the ingredients that make up the dish. In certain embodiments, ingredients are estimated using a knowledgebase of foods and recipes, in which, for example, image analysis determines that a photo depicts a lasagna, and ingredients are determined or predicted based on the determining the most common ingredients used in a collection of lasagna recipes in the knowledgebase. In certain embodiments, the ingredients can be estimated from the appearance of the ingredients recognized in the photo using only image analysis.

In one option for the processes shown in FIG. 8, step 804 may be followed by step 806, in which the new dish object 102 is associated with a restaurant visit by the user who took the underlying photo, for example, as described above in connection with FIG. 6C and elsewhere. Next, the service may provide or initiate providing any user who later views the dish object 102 (e.g., views the dish object via UI 330) with one or more user interfaces for requesting a reservation at the restaurant at a particular date and time or within a range of dates and times (step 808). A reservation suggestion may also be provided if any user performs a search that retrieves the dish object that is associated with the restaurant. Alternatively, the service may provide access to user interfaces for requesting delivery of the same dish depicted in the photo associated with the dish object. In certain embodiments, the same dish may be an entry listed in the restaurant's menu that has the same title as the dish object.

In another option for the processes shown in FIG. 8, step 804 may be followed by step 810, in which an ingredient list is created for the dish object based on the classification information obtained in step 804. Upon associating a dish object with an ingredient list, the service may represent the dish object as part of a recipe, e.g., such that UIs 200, 210, and 230 may be populated and used to present the corresponding recipe, including presenting the ingredient list via ingredient list panel 212 (step 812). Accordingly, for this or any recipe, in certain embodiments, the service may provide meal planning services—for example, the service may receive selections of one or more desired dishes (where candidate dishes for selection may be displayed as a feed of dish objects, similar to UI 300 shown in FIG. 3A), and the respective numbers of servings, and may automatically provide a list of the ingredients for those dishes. In certain embodiments, the list of ingredients may be organized by or associated with annotations for the appropriate grocery store aisle of a local grocery store, in which the local grocery store was identified based on the approximate geographic location of the viewing user, and the aisle information was identified using a knowledgebase of grocery store inventory and layout information (e.g., based on the identifier for a store and an ingredient name, the knowledgebase would provide the aisle information). In certain embodiments, where multiple desired dishes have been selected by the user, the service will provide an aggregated ingredient list in which the quantities for ingredients appearing in multiple ingredient lists are aggregated. In certain embodiments, the list of ingredients may be editable by the user, so that the user may re-order, add, or remove individual ingredients in the list, e.g., using a set of controls in which a selection can be associated with individual ingredients in the list, or all ingredients associated with a recipe, e.g. in order to formulate a shopping list. In certain embodiments, the selection may include an editable quantity associated with an ingredient. In certain embodiments, ingredients for one or more dishes/recipes are grouped into staples (e.g., flour, sugar, cooking oil and other ingredients likely to already be in the possession of the user) and non-staples (e.g., perishable goods such as parsley or chicken breasts, or infrequently used ingredients such as anise or dried apricots), such that the non-staples are provided as a default shopping list of selectable ingredients. In certain embodiments, certain ingredients are unavailable or de-selected by default where the service has information that the viewing user is already in possession of those ingredients, e.g., based on integration or communications from a "smart refrigerator" or internet-enabled food storage device that maintains information about the inventory of ingredients in a viewing user's possession. In certain embodiments, once an ingredient list has been finalized or confirmed by a user (e.g., by selecting some or all of the ingredients, or entering requested quantities for one or all of the ingredients), the service may provide a link to access a vendor, such as a food delivery service (e.g., AmazonFresh™, Instacart™ or Safeway™ grocery delivery) to automatically request delivery of the selected ingredients in the list. In certain embodiments, a vendor may be the grocery store (e.g., Whole Foods™, Safeway™) that stocks or sources the ingredients, and the delivery service may be a separate service (e.g., Instacart™) that enables delivery of the ingredients sourced from the selected store. In certain embodiments, the service may provide a control for requesting a print version of the finalized or confirmed ingredient list and a corresponding printable UI.

In another option for the processes shown in FIG. 8, step 810 may be followed by step 816, in which the inferred ingredient list of two dish objects (or the manually assigned ingredient lists of two recipes, or a recipe and dish object) can be compared to determine the similarity of the two ingredient lists and hence the similarity of two items (whether dish objects or recipes or a combination). Various techniques may be used to compare the similarity of two lists, including assessing the number of matching ingredient types or categories, or considering the amounts of ingredient types. In certain embodiments, two lists of ingredients are similar when the majority of the ingredients are the same. In certain embodiments, the assessment of the similarity of the ingredients or the items is affected by the matches regarding the title of the item or classification information associated with the item other than inferred ingredients, such as type of cuisine. In certain embodiments, two items are similar when the majority of the words in the title are the same and the majority of the words in the ingredients are the same. Next, in step 818, the service may identify restaurants that serve dishes that are similar to the dish being viewed by any user. The service may additionally filter the restaurants according to the location of the user viewing the dish object—for example, matching restaurants may be limited to only those that are geographically close to the viewing user's location (for example, within 5 miles, within 10 miles, within 20 miles, or within 50 miles of the user's location). The service may additionally filter restaurants according to other factors, such as restaurant ratings (e.g., only show restaurants that are highly rated or serve highly rated dishes, as recorded by other users of the service or third party services, or prioritize a listing of restaurants so that restaurants with higher ratings appear at the beginning of the list), and may additionally filter restaurants by price category (e.g., fine versus casual dining), or preferences as recorded in the viewing user's user profile 130 (e.g., prioritizing restaurants serving cuisines that a user prefers or tends to like as indicated by interactions with other dish objects and recipes, and for example filtering out restaurants serving cuisines for which the viewing user indicates a dislike based on responses to questions or comments on dish objects or recipes, or a lack of "likes"). In certain embodiments, the viewing user may be presented with access to UIs for requesting a reservation or ordering the similar dish as described with respect to step 808.

In another option for the processes shown in FIG. 8, step 804 may be followed by step 820, in which the new dish object 102 may be associated with a day. In certain embodiments, the dish object 102 may then be accessible via calendar-related UIs such as those described in regard to FIGS. 6A and 6B. Next, in step 822, the service may obtain nutritional information for each dish object associated with the day. The nutritional information may be obtained based on classification information, including an ingredient list, obtained in step 804. For example, the service may provide constituent ingredients and amounts of same from the ingredient list for a recipe to a remote database or service (e.g., the U.S. Department of Agriculture Food Composition Database), receive corresponding nutritional information for the ingredients and aggregate that information into, for example, the information shown in nutritional information panel 232 in FIG. 2D. The obtained nutritional information may thus include the calorie counts associated with each dish, which can be aggregated to estimate the number of calories a particular user (User A, in FIG. 8) has consumed in the day. In step 824, the service may obtain the user's fitness data for the day from a fitness tracker (e.g., a wearable fitness tracker such as an Apple Watch™ or a FitBit™). In certain embodiments, the user may manually provide the user's expended calories statistic to the service. As described, in certain embodiments, the food and recipe-sharing service may provide a full picture of the user's nutritional day contrasted with the user's activity (step 826). For example, the service may receive movement or other activity data from a wearable device, such as a FitBit™ or an Apple Watch™, and may provide such data on a UI in the form of a graph or bar chart. The service may additionally provide data about calories consumed, based on automatic estimation of nutritional data in the user's dish objects for a given day (or another period of time). The activity data and nutritional consumption data may be provided using overlaid or adjacent graphs so that a user may compare, e.g., calories in and calories out. In certain embodiments, the activity and nutritional data may be provided as aggregate quantities over a given period of time.

In certain embodiments, the food and recipe-sharing service may obtain nutritional recommendations from public sources such as the Food and Drug Administration (FDA), and such recommendations may be shared with users via the service. In certain embodiments, the food and recipe-sharing service may integrate with wearable technologies such as a FitBit™ or an Apple Watch™ to provide food and dietary recommendations. For example, if a user's caloric consumption (e.g., based on nutritional data associated with dish objects for a user within a particular time increment) is above a particular value appropriate for the user, the wearable device may provide a notification to avoid additional high calorie foods. In another example, a mobile device may be used to provide such notifications.

Figure 9:
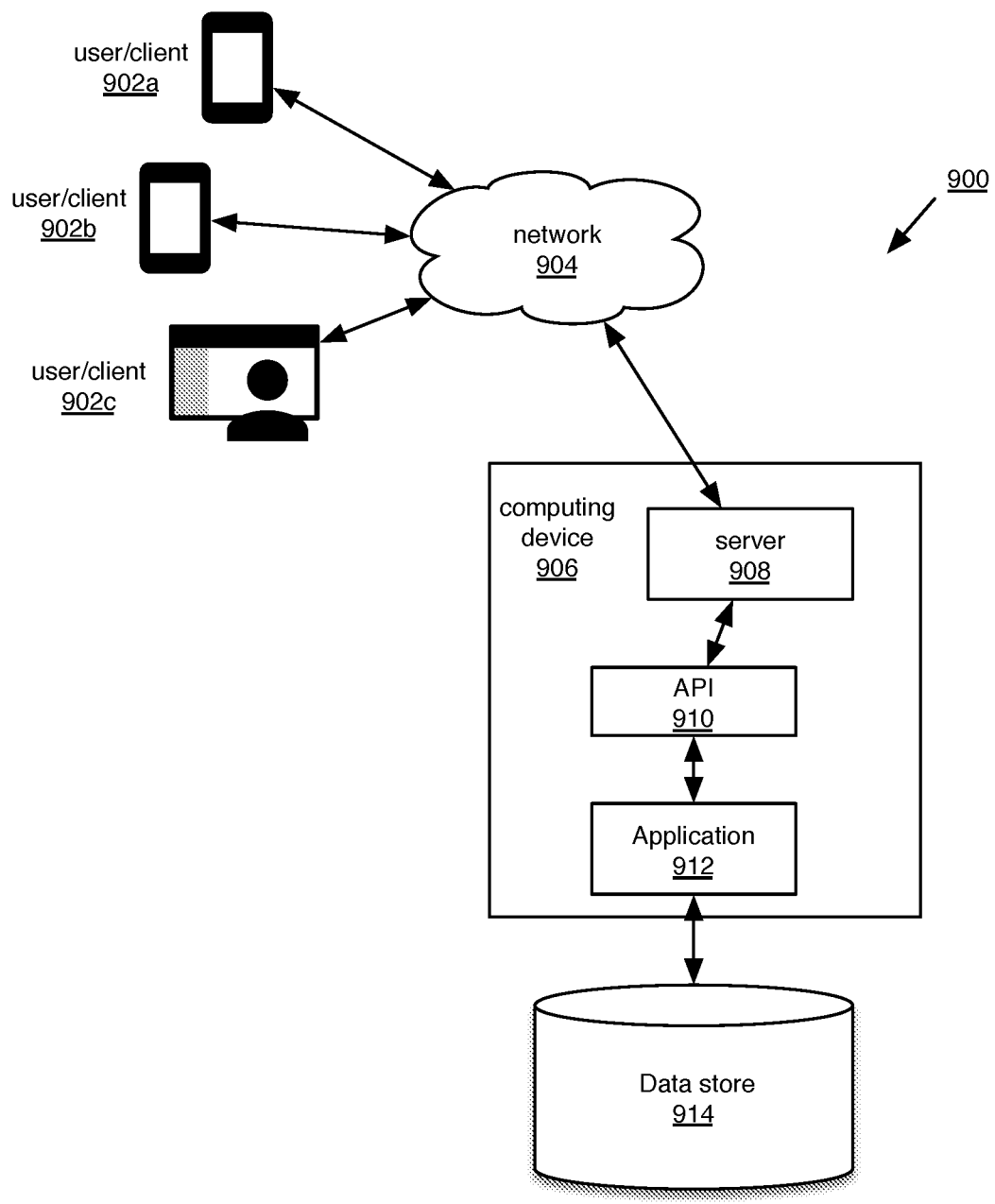
FIG. 9 is a block diagram showing exemplary data flows for an exemplary system in accordance with some embodiments of the invention.

FIG. 9 is a block diagram showing exemplary data flows for an exemplary system 900. In certain embodiments, the photos that may be used to create new dish objects 102 are first created or stored on one or more computing devices such as user/client 902*a-c*. User/client devices 902*a* and 902*b* may include mobile devices such as a tablet or smart phone. User/client device 902*c* may include a laptop or desktop computer. In certain embodiments, the user/client devices may provide data to computing device 906 via network 904. Network 904 may include a LAN, wired or wireless network, private or public network, or the internet.

In certain embodiments, one or more computing devices 906 host a server 908, such as an HTTP server, and an application 912 that implements aspects of the food and recipe sharing service. Recipe and dish image information may be stored in data store 914. Application 912 may support an Application Programming Interface (API) 910 providing external access to methods for accessing data store 914. In certain embodiments, client applications running on on user/client devices 902 may access API 910 via server 908 using protocols such as HTTP or FTP.

Below are set out hardware (e.g., machine) and software architectures that may be deployed in the systems described above, in various example embodiments.

Figure 10:
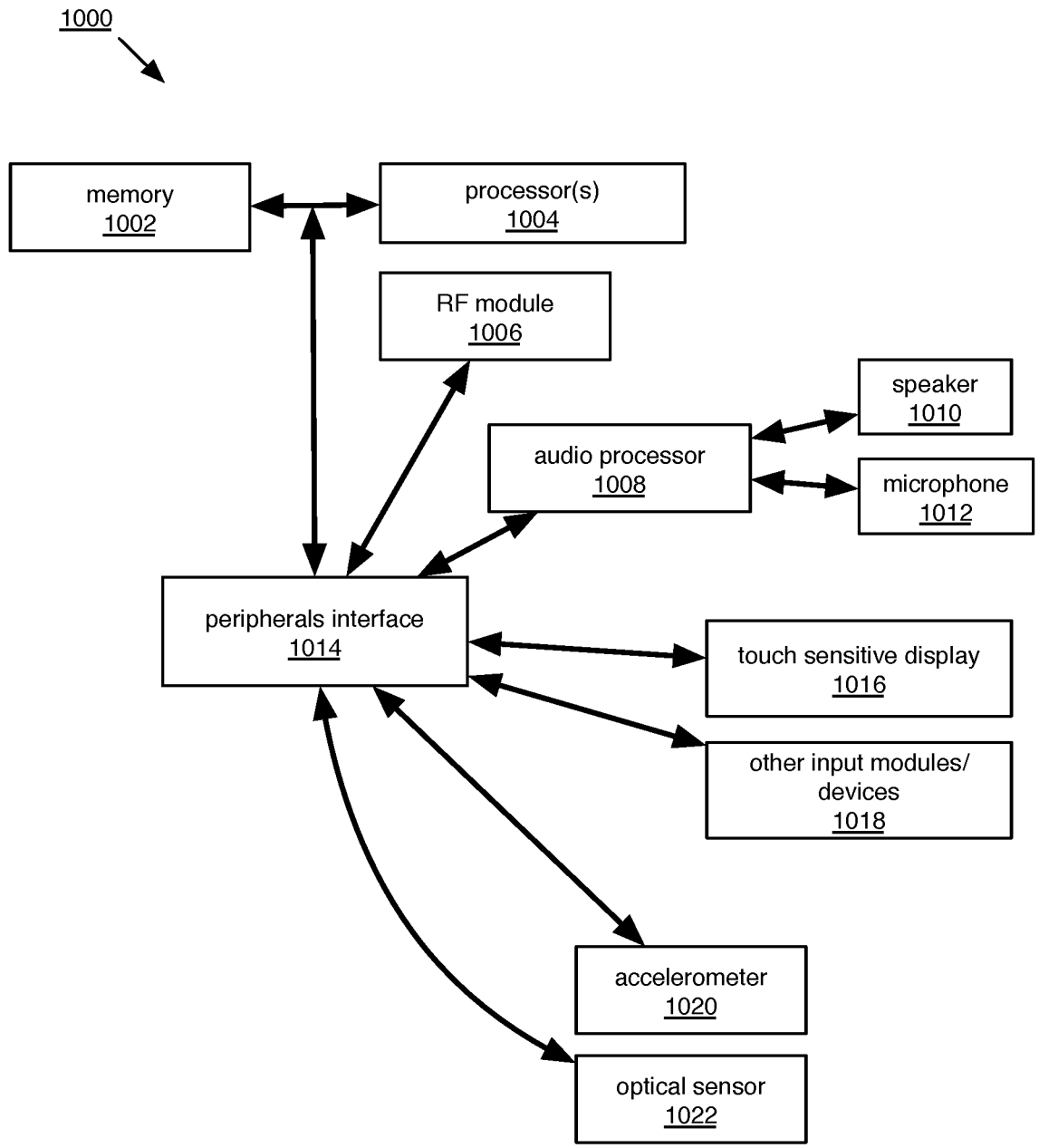
FIG. 10 is a block diagram showing an exemplary mobile computing device, consistent with some embodiments of the invention.

FIG. 10 is a block diagram showing an exemplary mobile computing device. The device 1000 may have a memory 1002 which may include one or more types of computer readable medium, such as RAM, optical storage devices, or flash memory. Memory 1002 may store an operating system, applications, and communication procedures. Device 1000 may include one or more data processors, image processors, or central processing units 1004. Device 1000 may include peripherals interface coupled to RF module 1006, audio processor 1008, touch sensitive display 1016, other input modules/devices 1018, accelerometer 1020 and optical sensor 1022.

RF module 1006 may include a cellular radio, Bluetooth radio, NFC radio, WLAN radio, GPS receiver, and antennas used by each for communicating data over various networks.

Audio processor 1008 may be coupled to a speaker 1010 and microphone 1012. Touch sensitive display 1016 receives touch-based input. Other input modules or devices 1018 may include, for example, a stylus, voice recognition via microphone 1012, or an external keyboard.

Accelerometer 1020 may be capable of detecting changes in orientation of the device, or movements due to the gait of a user. Optical sensor 1022 may sense ambient light conditions, and acquire still images and video.

Figure 11:
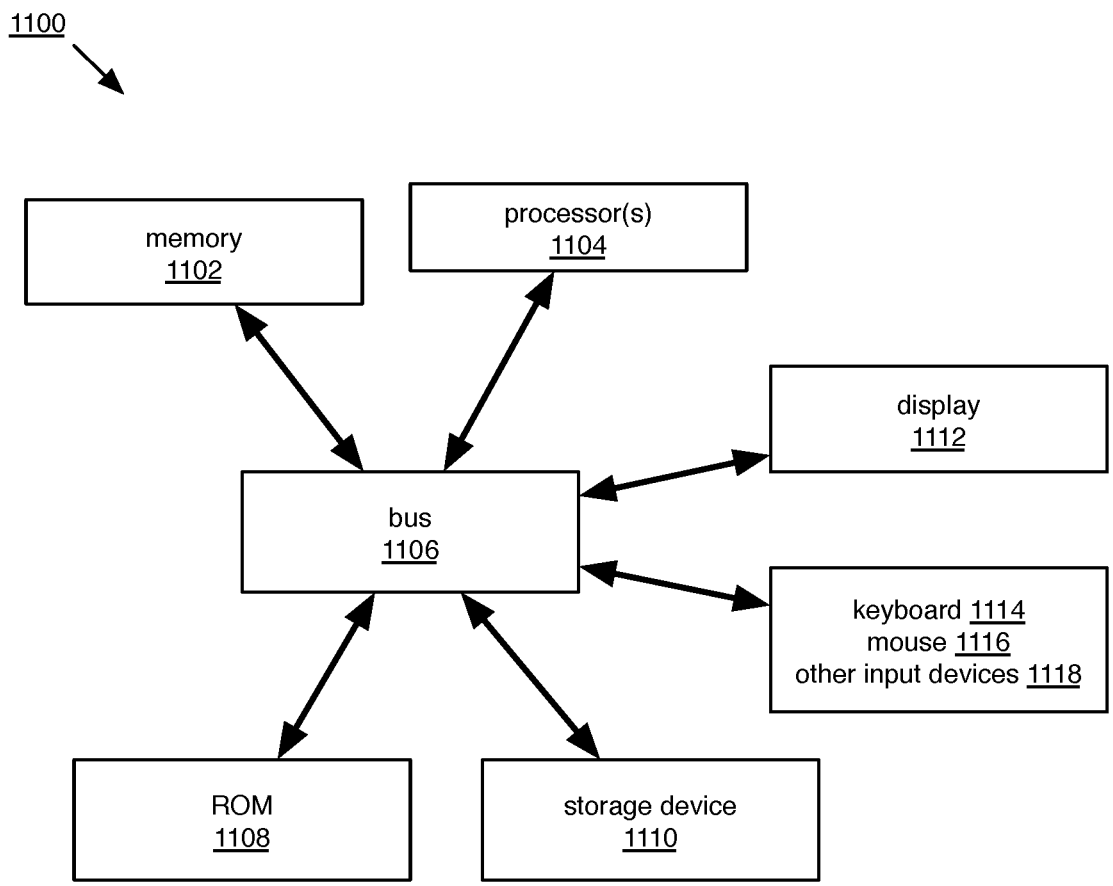
FIG. 11 is a block diagram showing an exemplary computing device, consistent with some embodiments of the invention.

FIG. 11 is a block diagram showing an exemplary computing system 1100 that is representative any of the computer systems or electronic devices discussed herein. Note, not all of the various computer systems have all of the features of system 1100. For example, systems may not include a display inasmuch as the display function may be provided by a client computer communicatively coupled to the computer system or a display function may be unnecessary.

System 1100 includes a bus 1106 or other communication mechanism for communicating information, and a processor 1104 coupled with the bus 1106 for processing information. Computer system 1100 also includes a main memory 1102, such as a random access memory or other dynamic storage device, coupled to the bus 1106 for storing information and instructions to be executed by processor 1104. Main memory 1102 also may be used for storing temporary variables or other intermediate information during execution of instructions to be executed by processor 1104.

System 1100 includes a read only memory 1108 or other static storage device coupled to the bus 1106 for storing static information and instructions for the processor 1104. A storage device 1110, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 1104 can read, is provided and coupled to the bus 1106 for storing information and instructions (e.g., operating systems, applications programs and the like).

Computer system 1100 may be coupled via the bus 1106 to a display 1112 for displaying information to a computer user. An input device such as keyboard 1114, mouse 1116, or other input devices 1118 may be coupled to the bus 1106 for communicating information and command selections to the processor 1104.

The processes referred to herein may be implemented by processor 1104 executing appropriate sequences of computer-readable instructions contained in main memory 1104. Such instructions may be read into main memory 1104 from another computer-readable medium, such as storage device 1110, and execution of the sequences of instructions contained in the main memory 1104 causes the processor 1104 to perform the associated actions. In alternative embodiments, hard-wired circuitry or firmware-controlled processing units (e.g., field programmable gate arrays) may be used in place of or in combination with processor 1104 and its associated computer software instructions to implement the invention. The computer-readable instructions may be rendered in any computer language including, without limitation, Objective C, C#, C/C++, Java, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1100 or similar electronic computing device, that manipulates and transforms data represented as physical (electronic) quantities within its registers and memories into other data similarly represented as physical quantities within its memories or registers or other such information storage, transmission or display devices.

Figure 12:
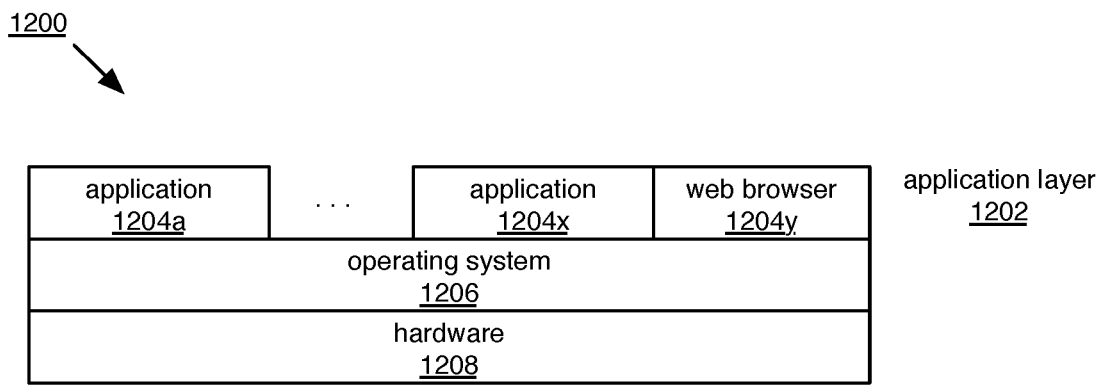
FIG. 12 is a block diagram showing an exemplary computing system, consistent with some embodiments of the invention.

FIG. 12 illustrates a computer system 1200 from the point of view of its software architecture. Computer system 1200 may be any of the electronic devices or, with appropriate applications comprising a software application layer 1202, may be a computer system for use with the publishing tools described herein. The various hardware components of computer system 1200 are represented as a hardware layer 1208. An operating system 1206 abstracts the hardware layer and acts as a host for various applications 1204, that run on computer system 1200. The operating system may host a web browser application 1204y, which may provide access for the user interfaces, etc.

The foregoing description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent & Trademark Office patent files or records, but otherwise reserves all copyright rights whatsoever. The following notice applies to the drawings that form a part of this document: Copyright 2015, Forq, Inc., All Rights Reserved.

What is claimed is:

1. A method for providing a food- and recipe-sharing service comprising:
   according to a schedule or an event, automatically polling a camera roll of a first mobile device for new images and, for each respective new image, creating a reduced-size image of the new image and providing the reduced-size image to a server;
   at the server, creating one or more dish objects based on the reduced-size images of the new images using a process comprising:
      receiving, at the server, the reduced-size images;
      determining whether each respective reduced-size image depicts food, and if food is depicted:
         determining classification information about the respective depicted food, wherein the classification information comprises a type of food;
         creating a respective new dish object by setting one or more attributes of the new dish object using the classification information about the depicted food and the corresponding respective reduced-size image, wherein each new dish object comprises the respective reduced-size image and a reference to a user that created the image;
      otherwise, if food is not depicted; not processing the respective reduced-size image further;
   receiving, at the server and a request from the first mobile device or a second mobile device, a request for dish objects associated with a specified type of food for presentation in a first user interface of the requesting first or second mobile device showing representations of the dish objects;
   identifying, at the server, one or more dish objects that satisfy the request, wherein a respective dish object is determined to satisfy the request if the specified type of food is similar to one or more attributes associated with the dish object; and
   in response to the request, providing the one or more identified dish objects to the first or second mobile device for presentation in the first user interface.

2. The method of claim 1, wherein the step of automatically Dolling the camera roll comprises defining the new images as each image saved to the camera roll of the first mobile device during the previous 24 hours, and creating reduced-size copies of each image of the first plurality of images.

3. The method of claim 1, wherein the step of automatically polling the camera roll comprises defining the new images as each image saved to the camera roll of the first mobile device that is associated with a geographic location of a restaurant based on a location of the mobile device or the header information of each image.

4. The method of claim 1, wherein the classification information includes the name of a recipe corresponding to the respective depicted food, and the name of the recipe is used to define a name attribute for the new dish object.

5. The method of claim 1, wherein the classification information includes the name of an ingredient contained within the respective depicted food, and the name of the ingredient is used to define an ingredient attribute for the new dish object.

6. The method of claim 1, wherein the specified type of food is similar to one or more attributes associated with the new dish object, because at least one of the values of the one or more attributes includes the specified type of food.

7. The method of claim 1, further comprising:
   receiving, at the requesting first or second mobile device and from the server, a first list containing a plurality of ingredients determined to be present in a particular new dish object;
   presenting, at the requesting first or second mobile device, a second user interface comprising: a dish object information panel, wherein the dish object information panel provides a first control to initiate selection of a corresponding delivery of one or more ingredients;
   responsive to selection of the first control, presenting at the requesting first or second mobile device, a third user interface comprising a second list of one or more ingredients from the plurality of ingredients, and a set of second controls for requesting delivery of one or more ingredients of the plurality of ingredients.

8. The method of claim 7, wherein the set of second controls enables selection of a single ingredient from the list and editing a quantity of the single ingredient.

9. The method of claim 7, wherein the second list of one or more ingredients consists of non-staple ingredients.

10. The method of claim 7, wherein the third user interface provides a control for selection of two or more vendors and association of a subset of the second list of one or more ingredients with a particular one of the two or more vendors.

11. The method of claim 10, wherein a vendor is a grocery store.

12. The method of claim 10, wherein a vendor is a delivery service.

13. The method of claim 1, further comprising:
providing, to the server, information sufficient to identify an approximate geographic location of a current user of the requesting first or second mobile device;
receiving, at the requesting first or second mobile device, a determination of one or more restaurants that are local to the requesting first or second mobile device, wherein each respective restaurant is associated with at least one similar second dish object to respective dish objects that satisfy the request;
presenting, at the requesting first or second mobile device, a dish object information panel that provides an indication of the one or more restaurants and a first set of controls to initiate a respective request for a second user interface concerning the respective restaurant of the one or more restaurants;
responsive to selection of a control of the first set of controls, presenting the second user interface, wherein the second user interface comprises information concerning the selected restaurant and a second control to initiate submission of a second request to the selected restaurant.

14. The method of claim 13, wherein the second request is a request for a reservation at the selected restaurant.

15. The method of claim 13, wherein the second request is a request for a delivery of a selected one of the dishes corresponding to the at least one similar dish object.

16. The method of claim 13, wherein the information sufficient to identify the approximate geographic location of a current user comprises a latitude and a longitude.

17. The method of claim 13, wherein a restaurant is local to the current user if the restaurant is located within 25 miles of the approximate geographic location of the current user.

18. The method of claim 13, wherein the indication of the one or more restaurants presents the one or more restaurants ordered in accordance with ratings for the respective restaurants.

19. The method of claim 13, wherein the first user interface provides a control for filtering the indication of the one or more restaurants according to a distance category or a price category.

* * * * *